United States Patent [19]

Chang et al.

[11] Patent Number: 4,635,063

[45] Date of Patent: Jan. 6, 1987

[54] ADAPTIVE ANTENNA

[75] Inventors: Donald C. D. Chang; Eng-Chong Ha, both of Torrance, Calif.

[73] Assignee: Hughes Aircraft Company, Los Angeles, Calif.

[21] Appl. No.: 492,073

[22] Filed: May 6, 1983

[51] Int. Cl.[4] .................................... G01S 3/16

[52] U.S. Cl. .................................... 342/380; 342/383

[58] Field of Search .................... 343/377, 378-384, 343/385; 455/283, 210, 278, 296, 273, 276, 137; 364/728, 581

[56] References Cited

U.S. PATENT DOCUMENTS

| | | | |
|---|---|---|---|
| 4,032,922 | 6/1977 | Provencher | 343/373 |
| 4,079,380 | 3/1978 | Esry et al. | 343/379 |
| 4,204,211 | 5/1980 | Cavelos | 343/380 |
| 4,255,791 | 3/1981 | Martin | 343/378 |
| 4,280,128 | 7/1981 | Masak | 343/380 |

*Primary Examiner*—Theodore M. Blum
*Assistant Examiner*—D. Cain
*Attorney, Agent, or Firm*—J. A. Sawyer, Jr.; M. J. Meltzer; A. W. Karambelas

[57] ABSTRACT

An adaptive antenna 10 embodying the present invention includes an array of sensors 12. Each sensor 12 has associated therewith a main channel 14, a feedthrough path 16 and a feedback path 18. Correlators 20 coprocess signals in the feedthrough path 16 and the feedback path 18; the result is transformed according to an algorithm by a computer 22 which controls a weighting circuit 24. The weighting circuit 24 thus progressively modifies the signal in the main channel 14 to minimize interference with a desired signal. Placement of a limiter 26 along the feedback path 18 simplifies correlator design relative to adaptive antennas without such limiters and improves performance relative to adaptive antennas with limiters in the feedthrough path.

10 Claims, 2 Drawing Figures

ADAPTIVE ANTENNA

BACKGROUND OF THE INVENTION

The present invention relates to adaptive antenna systems.

Antennas are used to receive signals for imaging, communications and other purposes. The ability to detect a signal is adversely affected by the presence of extraneous transmissions such as background noise, transmissions intended for other devices, or jamming signals designed to impair the performance of the given antenna.

Adaptive antennas employ feedback to enhance their signal-to-noise ratio, or signal-to-jamming ratio. Adaptive antennas typically divide the signal received by each antenna element into a signal to be processed and directed along a main channel and an unprocessed signal to be correlated with the processed signal.

The processing normally involves weighting amplitude and phase of the signal according to an algorithm incorporating the correlation results of the divided signals. The processing further involves summing the weighted signals from plural antenna elements. A correlator, which may be a multiplier coupled with a low pass filter, correlates the processed and unprocessed signals. The correlator resultant is transformed in accordance with the predetermined algorithm to determine the weighting of subsequent signals.

Two problems arise in connection with the characterized adaptive antenna. In the first place, there are many circumstances where improved performance would be required. In the second place, where the signals involve large dynamic ranges, the limits of correlator design are quickly realized.

Dynamic range requirements of an adaptive processor are of great importance in the design of the correlator. The design requirement of the correlator is determined by the dynamic range of the output, which may equal the sum of the dynamic ranges of the two inputs. Where the dynamic ranges of the inputs are 40 dB each, the output may be 80 dB. While a 60 dB dynamic range is manageable, to achieve an 80 dB dynamic range of the correlator output is very difficult. Accommodating the increased dynamic range presents a difficult problem due to the constraints of existing component technology.

Therefore, it is common practice to insert limiters along the paths of the unprocessed signals between antenna sensors and correlators. Limiting the dynamic range of the corresponding correlator inputs reduces design requirements to readily achievable levels.

It is generally agreed that such limiting does not seriously degrade the performance of the incorporating adaptive antenna in the presence of single interferers or multiple interferers with comparable power levels. On the other hand, limiting the unprocessed signals does degrade the performance of an adaptive antenna in the presence of two or more interferers of very different power levels.

What is needed is an adaptive antenna which is effective in the presence of multiple interferers of very different power levels where large dynamic ranges are involved. Generally, improved overall performance and mitigated demands on correlator design are also desired.

SUMMARY OF THE INVENTION

An adaptive antenna and process including limiting a signal in a feedback path provide substantially improved performance and alleviate design demands on an included correlator. The improved performance is most dramatic with respect to interferers of very different power levels.

The novel adaptive antenna includes two or more antenna sensors. Signal dividers split each sensors output into two signals: an unprocessed signal to be fed via a feedthrough path to one input of a correlator; and a signal to-be-processed by a weighting circuit along a main channel. The output of each weighting circuit is a signal properly modified in amplitude and phase. The weights are controlled by feedback circuitry via a computer.

The weighted signals associated with each sensor are then added together by a power combiner or other summing means. The summed signal may then be divided to produce the adaptive antenna output, and a feedback signal. The dynamic range of the feedback signal is controlled by a limiter. The limited feedback signal then serves as an input to the second input of each of the correlators.

Each correlator may multiply the unprocessed and processed (weighted, summed and limited) inputs, and pass the product through a low pass filter to eliminate the high frequency product terms. The correlator output is then transformed by a computer according to an algorithm, such as those readily available in the antenna literature, and the transform is used to determine the new weights to be applied to the processor.

In operation, the novel adaptive antenna initially acts to reduce the intensity of the strongest interferer. However, as said intensity is reduced to a level comparable to a secondary interferer, the intensities of both interferers are progressively diminished. The invention provides for comparable or superior performance to a similar device without the limiter while dramatically reducing the dynamic range requirements on the correlator. When compared to a device with limiters in the path of the unweighted signal of the feedthrough path, the present invention provides superior dynamic range reduction, and clearly superior cancellation of secondary interferers. Furthermore, only one limiter is required in the inventive antenna, whereas two or more are required in the alternative device.

DETAILED DESCRIPTION OF THE INVENTION

Figure 1:
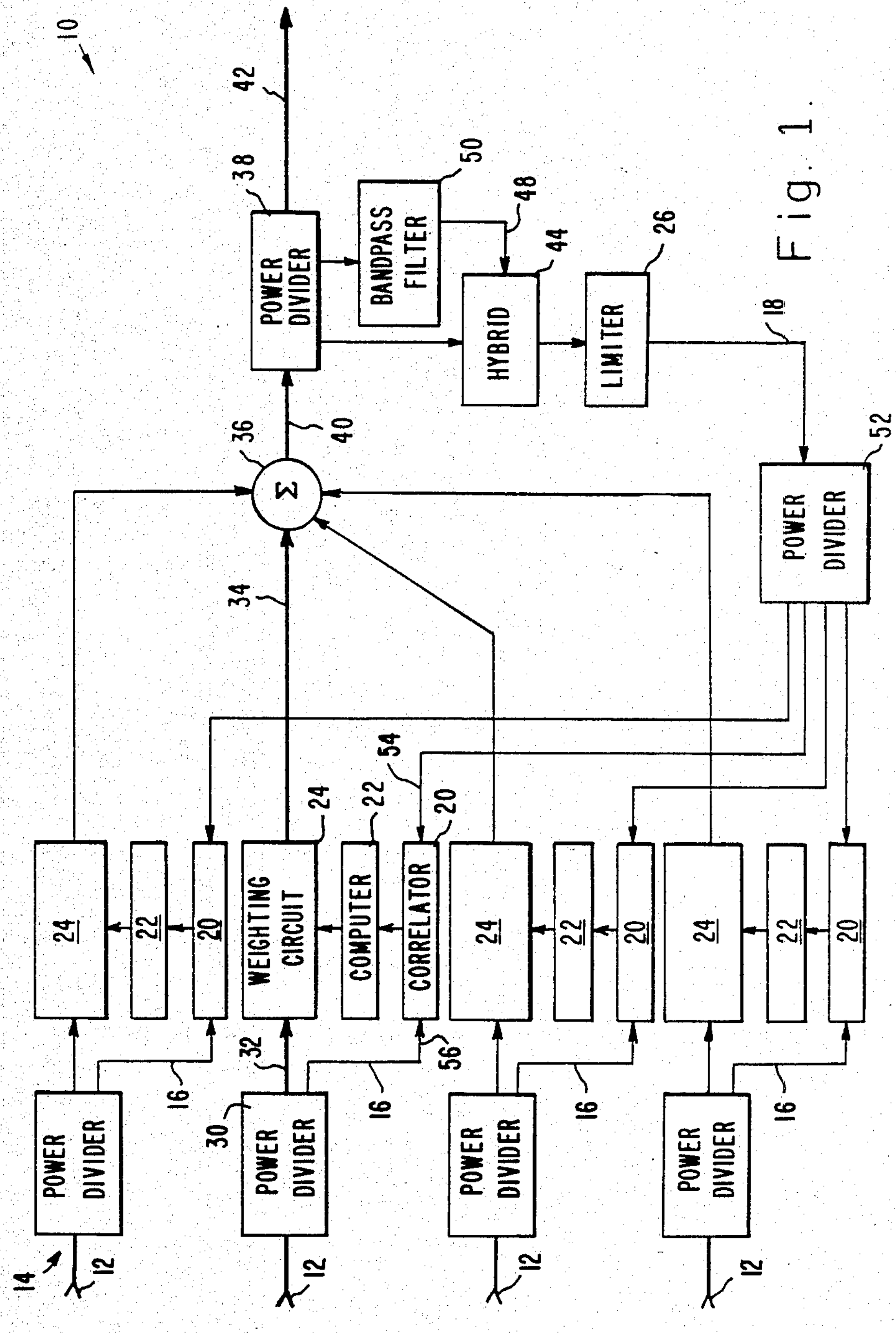
FIG. 1 is a schematic diagram of an adaptive antenna in accordance with the present invention.

An adaptive antenna 10 embodying the present invention includes an array of antenna elements or sensors 12; the embodiment illustrated in FIG. 1 includes four such sensors. Each sensor 12 has associated therewith a main channel 14, a feedthrough path 16 and a feedback path 18. (In FIG. 1, since the circuitry associated with the respective sensors are substantially the same, the circuitry associated with only one sensor is referenced in detail; also, the main channel associated with this sensor is thickened to facilitate reference.)

Correlators 20 coprocess signals in the feedthrough path 16 and the feedback path 18; the result is transformed according to an algorithm by a computer 22 which controls a weighting circuit 24. The weighting circuit 24 thus progressively modifies the signal in the main channel 14 to minimize interference with a desired signal.

In accordance with the present invention, a limiter 26 is placed along the feedback path 18. As explained below, this placement simplifies correlator design relative to adaptive antennas without such limiters and improves performance relative to adaptive antennas with limiters in the feedthrough path.

Describing the illustrated embodiment in greater detail, each sensor 12 is connected via the respective main channel 14 to a respective input power divider 30 or other means for dividing an input signal between a preprocessed signal and a diagnostic signal. The diagnostic signal is conveyed along the respective feedthrough path 16; the preprocessed signal is conveyed along a second portion 32 of the respective main channel 14.

The amplitude and phase of preprocessed signals may be modified by the weighting circuits 24 or other weighting means associated with each of the sensors 12. The resulting weighted signals are directed along a third portion 34 of the respective main channels 14 to be summed by means such as a power combiner 36. Means such as an output power divider 38 inserted along a unified portion 40 of the main channel 14 between the power combiner 36 and an antenna output 42 divides the summed signal between an output signal and a feedback signal.

The illustrated feedback path 18 includes means for eliminating from the feedback signal the desired band of frequencies associated with the primary signal source to be received by the antenna 10. This means may include a hybrid 44 for subtracting the desired band from a portion of the summed signal.

More particularly, the hybrid 44 includes a primary input 46 and a secondary input 48. The primary input 46 receives a portion of the summed signal from the output power divider 38. The secondary input 48 receives only that part of the summed input within the desired band. The desired band may be provided by means of a bandpass filter 50, the input of which is a portion of the summed signal directed thereto by the output power divider 38. The output of the hybrid is the summed signal less the desired band. The elimination of the desired band from the feedback signal avoids possible nulling against the desired signal source.

The limiter 26 is located in the feedback path 18 so that limiting occurs prior to division of the feedback signal. Thus, the need for plural limiters is obviated. Preferably, the limiter 26 is a hard limiter. Ideally, a hard limiter transforms a sinusoidal input to a square wave output.

The limited feedback signal is divided by means such as a feedback power divider 52 to provide divided feedback signals to feedback inputs 54 of the correlators 20. The feedback signal is correlated with the diagnostic signal received at the feedthrough input 56 of each correlator 20. The preferred correlator 20 is a multiplier coupled with a low pass filter.

Each correlation resultant is transformed according to an algorithm by the computer 22 or alternative means. The transform is used to determine the weighting function of the weighting circuit 24 or other weighting means. Preferably, a gradient descent algorithm, such as least mean square (LMS) error, Howell-Applebaum or power inversion, is used.

Some of the advantages of the present invention can be better understood in accordance with the following theoretical analysis. The function of the ideal hard limiter is to produce a high constant level positive output whenever the input is positive and a low constant level negative output whenever the input is negative. The transition between the constant positive and negative output values (or the threshold values) is a sharp or discontinuous one. Therefore, with a sinusoidal input the output would ideally be a square wave. In a multiple signal environment where the signal power differences are large (e.g., more than 10 dB), the limiter will suppress weaker signals and enhance the strongest signal. Qualitatively, the limiter will only respond to the strongest signal.

In a phased array geometry, each element shares the same field of view as every other element. Therefore, each element plays a nearly equal role in forming a single beam. All jamming signals in the field of view are sensed by every single element in the phased array. Consequently, the positioning of the limiter in either the feedthrough path or the feedback path is critical for multi-jammer rejection in the phased array.

If the limiter is placed in the feedthrough path, its output will have merely the information of the strongest jammer, and the antenna system will null against the strongest jammer accordingly. The correlator outputs will not include any of the other jamming signal information to allow the antenna system to form nulls in their directions.

Alternatively, when a hard limiter is placed in the feedback path, the antenna system can first null against the strongest jammer signal until it becomes comparable to the second strongest. The antenna system will then null against both until the antenna system reaches an inherent threshold level, created by quantization error or feedback loop gain, limiter, etc.

Figure 2A:
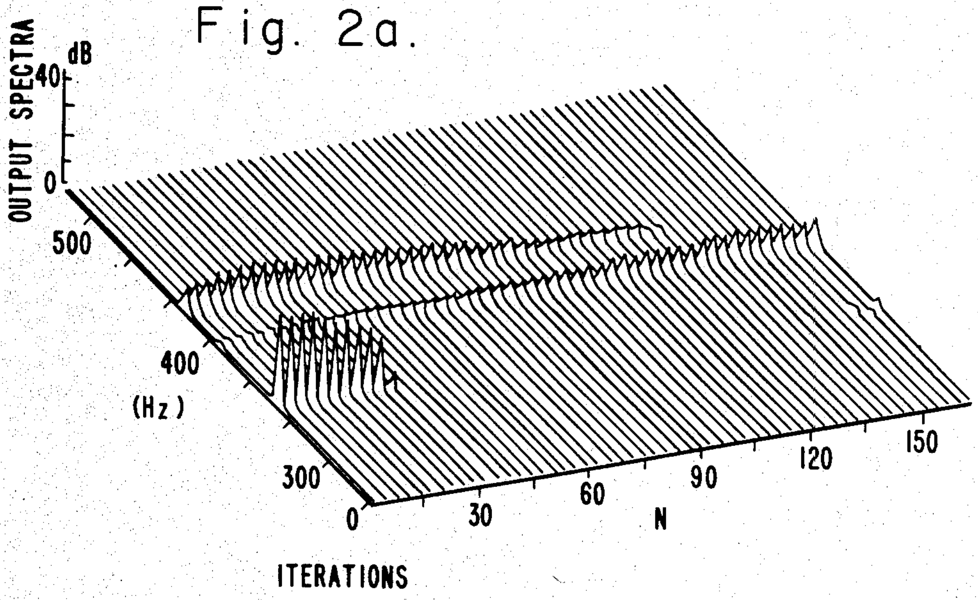
FIG. 2 is a set of dynamic spectra comparing the performances of alternative adaptive antennas with that of an antenna in accordance with the present invention.
Figure 2B:
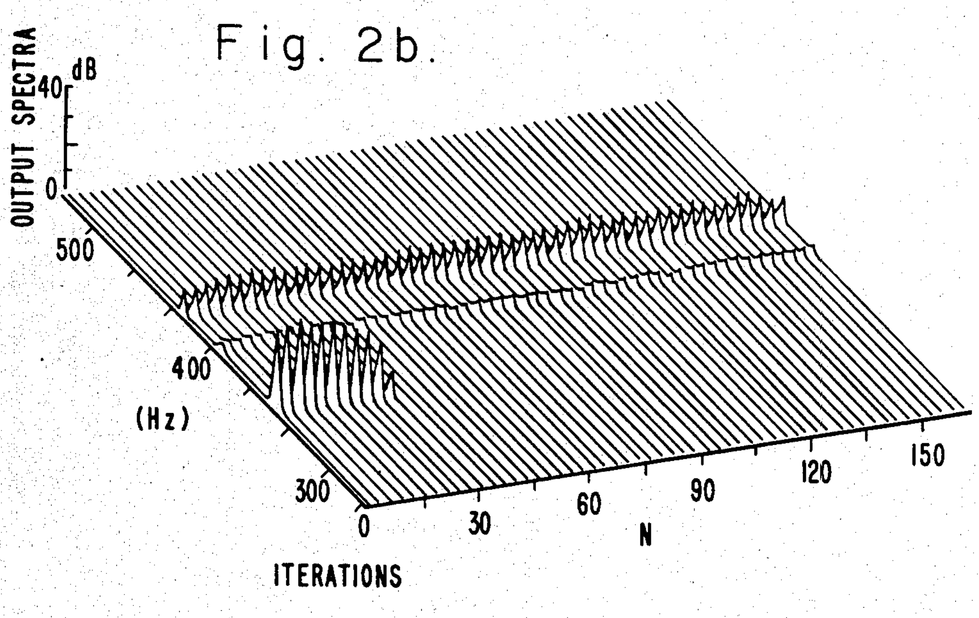
Figure 2C:
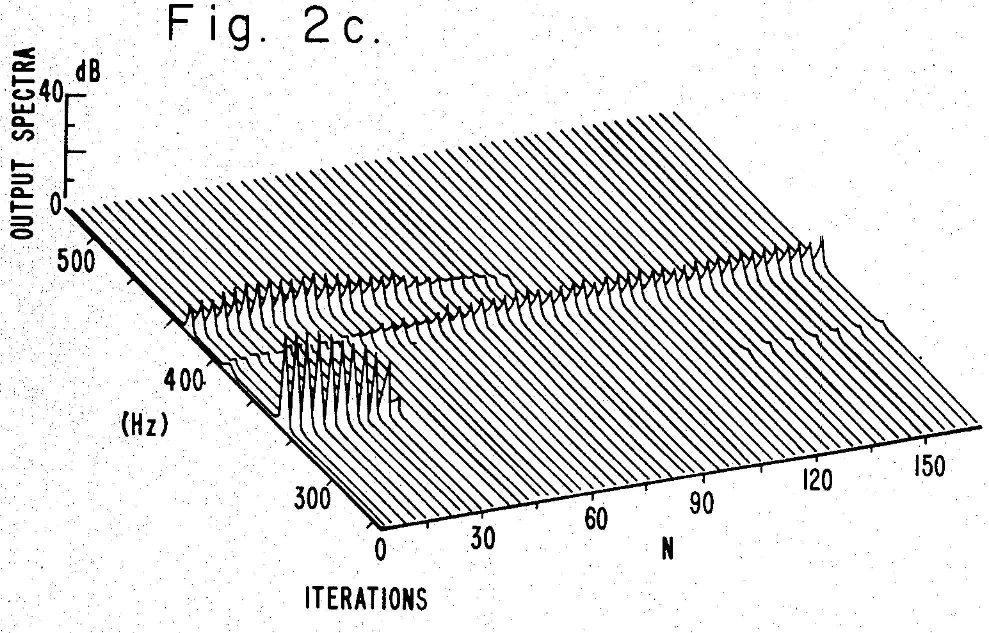

FIG. 2 shows a comparison of the jammer suppression performance and the convergence rate of three four-element phased array configurations: (a) no limiter, (b) limiters in the feedthrough path, and (c) limiter in the feedback path. These results were obtained from a computer simulation program, ADAPT, and are the dynamic spectral output versus the number of iterations of the adaptive process.

As the adaptive process proceeds from the initial state in the configuration with no limiter, the strongest jammer is monotonically reduced until it is below the threshold value at iteration 37, as shown in FIG. 2(*a*). The threshold value is set 35 dB below the strongest jammer. The weaker jammer was not a driving force until iteration 34. At this point, the weaker jammer is slowly but continuously suppressed. At iteration 126, the jammer signal is below the threshold value. During the adaptation, the desired signal power density at the output is continually being enhanced until it reaches a steady state value of 10 dB above the threshold at iteration 134.

In the configuration with the limiter in the feedthrough path, the power density level of the stronger jammer is successively reduced below threshold but the power density level of the weak jammer increases initially and remains at that steady state value as shown in FIG. 2(*b*). The desired signal increases slightly in value, but is never enhanced above the weak jammer.

In the configuration with the limiter in the feedback path, the power density levels of both the weak and strong jammers are successfully reduced below the threshold as seen in FIG. 2(*c*). As compared to the configuration with no limiter, the weaker jammer is suppressed slightly faster. The weak jammer is below threshold at iteration 87. Throughout this process, the desired signal is continuously enhanced.

In accordance with the above, it can be seen that the present invention provides for improved performance over the no-limiter and limiter in the feedthrough path designs of the prior art. The present invention further immproves on the feedthrough limiter version by requiring only one limiter, and improves upon the no-limiter version in relieving the design requirements on the correlators.

Many modifications may be made upon the illustrated embodiment. For example, seven or another number of antenna elements could be used in various arrays. Different components and algorithms could be incorporated. These and other variations are within the scope of the present invention.

What is claimed is:

1. An adaptive antenna comprising:
sensors;
divider means associated with each said antenna sensor and having first and second outputs, said divider means being adapted for dividing a signal received by the respective of said sensors between said first and second outputs;
weighting means associated with each antenna sensor for modifying a signal according to a predetermined function, said weighting means being operatively connected to the first output of the respective of said divider means and adapted to receiving a signal therefrom, each said weighting means having an output;
summing means operatively connected to said outputs of said weighting means for summing the signals thereform;
limiter means for limiting the dynamic range of a signal output of said summing means;
correlator means associated with each sensor for correlating a signal output from the second output of the respective of said dividers with a signal output of said limiter means; and
algorithm means associated with each sensor for determining the function of the respective weighting means in response to a respective correlator signal output.

2. The adaptive antenna of claim 1 further comprising means for dividing a signal output of said summing means between an antenna output signal and an input signal for said limiter means.

3. The adaptive antenna of claim 1 or 2 further comprising means for subtracting a predetermined frequency band operatively connected to said summing means and said limiter means so that a signal input to said limiter means can include negligible energy within the predetermined frequency band.

4. A process for the adaptive detection of signals providing for the cancellation of interferers comprising:
receiving signals at sensor inputs, the phase relationships at said sensors being a function of the direction of the source of said signals;
dividing each received signal into first and second signals;
modifying the amplitude and phase of each said first signal by a function;
summing the modified first signals;
dividing the summed signal between an antenna output signal and a feedback signal;
limiting the feedback signal;
correlating the feedback signal and said second signal; and
modifying said function in response to the correlation resultant according to a predetermined algorithm.

5. The process of claim 4 further comprising the step of subtracting a predetermined frequency band from said feedback signal.

6. An adaptive antenna comprising:
a sensing element;
first divider means for dividing the output of the sensing element into first and second signals;
weighting means for modifying said first signal according to a predetermined function;
second divider means for dividing a signal output of said weighting means into third and fourth signals, said third signal being an antenna output signal and said fourth signal being a feedback signal;
limiter means for limiting the dynamic range of said feedback signal;
means for correlating the limited feedback signal with the second signal to provide a correlated signal; and
computing means for determining the function of the weighting means in response to said correlated signal.

7. The adaptive antenna of claim 6 further comprising means for subtracting a predetermined frequency band from said feedback signal.

8. An adaptive phased array antenna comprising:
a plurality of sensing elements;
a first power dividing means associated each element for dividing the output of each sensing element into first and second signals;
a weighting means associated with each first power divider for modifying said first signal from an element according to a predetermined function;
summing means for combining the signals output from each of the weighting means;
second power divider means for dividing the signal output from said summing means between third and fourth signals, said fourth signal being a feedback signal;
means for subtracting a predetermined frequency band from said feedback signal;
means for limiting the dynamic range of the feedback signal as output from said subtracting means;
third power divider means for distributing the limited feedback signal to correlator means,
said correlator means being adapted to correlate said limited feedback signal with said second signal to provide a correlated signal for each sensing element; and
computing means for determining the function of each of said weighting means in response to said correlated signals.

9. The adaptive antenna of claim 6 wherein said first and second signals are substantially identical in amplitude, frequency and phase.

10. The adaptive antenna of claim 8 wherein said first and second signals are substantially identical in amplitude, frequency and phase.

* * * * *